(12) United States Patent
Candelore (10) Patent No.: US 10,943,268 B2
(45) Date of Patent: Mar. 9, 2021

(54) PAYING FOR CONTENT THROUGH MINING

(71) Applicant: Sony Corporation, Tokyo (JP)

(72) Inventor: Brant Candelore, Escondido, CA (US)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 15/860,396

(22) Filed: Jan. 2, 2018

(65) Prior Publication Data

US 2019/0205943 A1    Jul. 4, 2019

(51) Int. Cl.
| | | |
|---|---|---|
| G06Q 30/00 | (2012.01) | |
| G06Q 30/02 | (2012.01) | |
| A63F 13/79 | (2014.01) | |
| A63F 13/61 | (2014.01) | |
| G06F 3/14 | (2006.01) | |

(52) U.S. Cl.
CPC ......... *G06Q 30/0273* (2013.01); *A63F 13/61* (2014.09); *A63F 13/79* (2014.09); *G06F 3/14* (2013.01); *G06Q 30/0277* (2013.01)

(58) Field of Classification Search
CPC ........ G06Q 30/0207–0277; G06Q 20/14–306; A63F 13/61–79; A63F 13/792; H04L 67/38
See application file for complete search history.

(56) References Cited

U.S. PATENT DOCUMENTS

| | | | |
|---|---|---|---|
| 10,437,607 B2 | 10/2019 | Kim et al. | |
| 2001/0039497 A1* | 11/2001 | Hubbard | G06F 9/5044 709/201 |
| 2007/0055641 A1 | 3/2007 | Ratcliff | |
| 2007/0214049 A1 | 9/2007 | Postrel | |

(Continued)

FOREIGN PATENT DOCUMENTS

| | | |
|---|---|---|
| JP | 2005018320 A | 1/2005 |
| KR | 20120047487 A | 5/2012 |

(Continued)

OTHER PUBLICATIONS

Astronomical and biochemical origins and the search for life in the universe; Proceedings of the 5th international conference on bioastronomy; held in Capri; Italy; Jul. 1-5, 1996; Publisher: Bologna; Italy: Editrice Compositori; 1997; https://ui.adsabs.harvard.edu/abs/1997abos.conf..729S/abstract (Year: 1997).*

(Continued)

*Primary Examiner* — Kambiz Abdi
*Assistant Examiner* — Christopher Stroud
(74) *Attorney, Agent, or Firm* — John L. Rogitz (57) ABSTRACT

A display device "app" maintains the processor and graphics chip of the device energized but deenergizes the display responsive to an "off" command. The energized components are used in the background for cooperative computer tasks such as bitcoin mining that can lead to remuneration, with any remuneration so received being credited to an account. When a viewer wished to view content that requires payment, the account is debited accordingly, and no further payment is demanded, and advertisements are omitted from the content. Should the account be short of necessary funds to pay for the demanded content, the "app" can present advertisements in the content and/or require input of payment.

15 Claims, 3 Drawing Sheets

(56) References Cited

U.S. PATENT DOCUMENTS

2012/0320280 A1    12/2012  Waites et al.
2013/0174191 A1*  7/2013  Thompson, Jr. ... G06Q 30/0207
                                                              725/23
2016/0292672 A1*  10/2016  Fay ..................... G06Q 20/363

FOREIGN PATENT DOCUMENTS

KR      1020150116477 A    10/2015
KR      1020170046541 A     5/2017

OTHER PUBLICATIONS

"What is Gridcoin", Gridcoin—Rewarding Scientific Distributed Computing, Oct. 16, 2013, http://www.gridcoin.us/index/htm.

Kai et al., "Implementation of Virtual Dynamic Personal Cluster", 2008 Seventh International Conference on Grid and Cooperative Computing, Oct. 31, 2008.

Cryptocoin, "WinMiner, the challenger for NiceHash" (Dec. 12, 2017).

* cited by examiner

PAYING FOR CONTENT THROUGH MINING

FIELD

The present application relates to technically inventive, non-routine solutions that are necessarily rooted in computer technology and that produce concrete technical improvements.

BACKGROUND

Modern video display devices such as internet-enabled TVs offer viewers a wide selection of content to choose from. Much of that content is pay-per-view or available through a paid subscription service. Understandably, viewers don't always want to pay to subscribe to a service to view content, yet content worth watching is costly. Even so-called "free" Internet and broadcast TV services extract a cost through forcing people to view advertisements, which many viewers find annoying.

SUMMARY

Present principles leverage the computing power of display devices when they are turned off to use the CPU and graphics chips to earn financial credit toward anything, and in particular to pay for premium video. Indeed, recognizing that most of the time, display devices such as TVs are off, owners of such devices will care little if the TV is burdened with other tasks during such periods because video presentation will not be delayed or otherwise unduly affected. Often, relatively little data is needed for some tasks and so network bandwidth consumption can be held to a relatively low level.

In one embodiment, a display device receives (via download or built-in) and executes a computer application ("app") that debits an account of a person associated with the device that has built up credits by allowing the device to be used for computing tasks while otherwise "off", i.e., not being viewed. The app intercepts an "off" signal, e.g., as might be generated from manipulation of an "off" button on a remote control (RC) and deenergizes the display while maintaining the processor and if desired graphics chip of the device energized and operational. The app then uses the energized components of the device to execute programs such as "Bitcoin Mining" or "SETI Alien Search" which can confer financial credit on cooperating devices. The app credits the user's account according to the program rules and/or when processor and/or graphics chip are available for certain threshold periods of time. When insufficient credit exists in the user's account and the user desires to view content that requires payment, the "app" can present advertisements in the content and/or require input of payment. When sufficient credits from "mining" or other such cooperative processing exists in the user account, no further payment is required to view content that otherwise requires payment and the advertisements are omitted from presentation, e.g., by skipping the advertisements, or by not inserting them into the video stream, or by other appropriate means.

Accordingly, in one aspect a computer program product includes at least one computer program storage medium that is not a transitory signal and that includes instructions executable by at least one processor to, responsive to a command to deenergize a display of a device and with at least one processor of the device energized, use the processor to execute a program with the display deenergized. The instructions are executable to cause credit to be accorded to an account in accordance with executing the program. The instructions are executable to, responsive to the display being re-energized and a content player application started to play content on the display, responsive to a request for content requiring payment, determine whether sufficient credit in the account gained from executing the program exists to pay for the content. Responsive to determining that sufficient credit in the account gained from executing the program exists to pay for the content, the instructions are executable to present the content without advertisements and/or not demanding payment for the content. On the other hand, responsive to determining that insufficient credit in the account gained from executing the program exists to pay for the content, the instructions are executable to present the content with advertisements and/or demand payment for the content.

In examples, the instructions may be configured to, responsive to determining that sufficient credit in the account gained from executing the program exists to pay for the content, transfer credit from the account to a provider of the content in exchange to receive the content. The program may include solving at least one mathematics problem, for example, mining for block chain-based currency. The program may include analyzing telescope data. The instructions can be downloaded as a computer software application to the device, or they can be built in to the device in memory during manufacture of the device. The system may include the display and the processor.

In another aspect, a method includes pre-installing or downloading an application to a game console or display device, and executing the application to remunerate a user account for use of processing power of the game console or display device when the game console or display device is not being used for playing a game or displaying content.

In another aspect, an apparatus includes at least one video display, at least one processor configured to control the at least one display, and at least one computer storage accessible to the at least one processor and including instructions executable by the processor to configure the processor to receive a command to stop using the display to present video programming content. The instructions are executable to, responsive to the command to stop using the display to present video programming content, execute at least one remunerative program. The instructions are further executable to receive a command to use the display to present video programming content, and responsive to the command to use the display to present video programming content, stop execution of the at least one remunerative program and present the video programming content.

In another aspect, a content player application checks a credit in an account that has been created by executing a remunerative program when the platform that it is downloaded to is in standby mode or the display has been de-energized.

The details of the present disclosure, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures. etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments inany appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
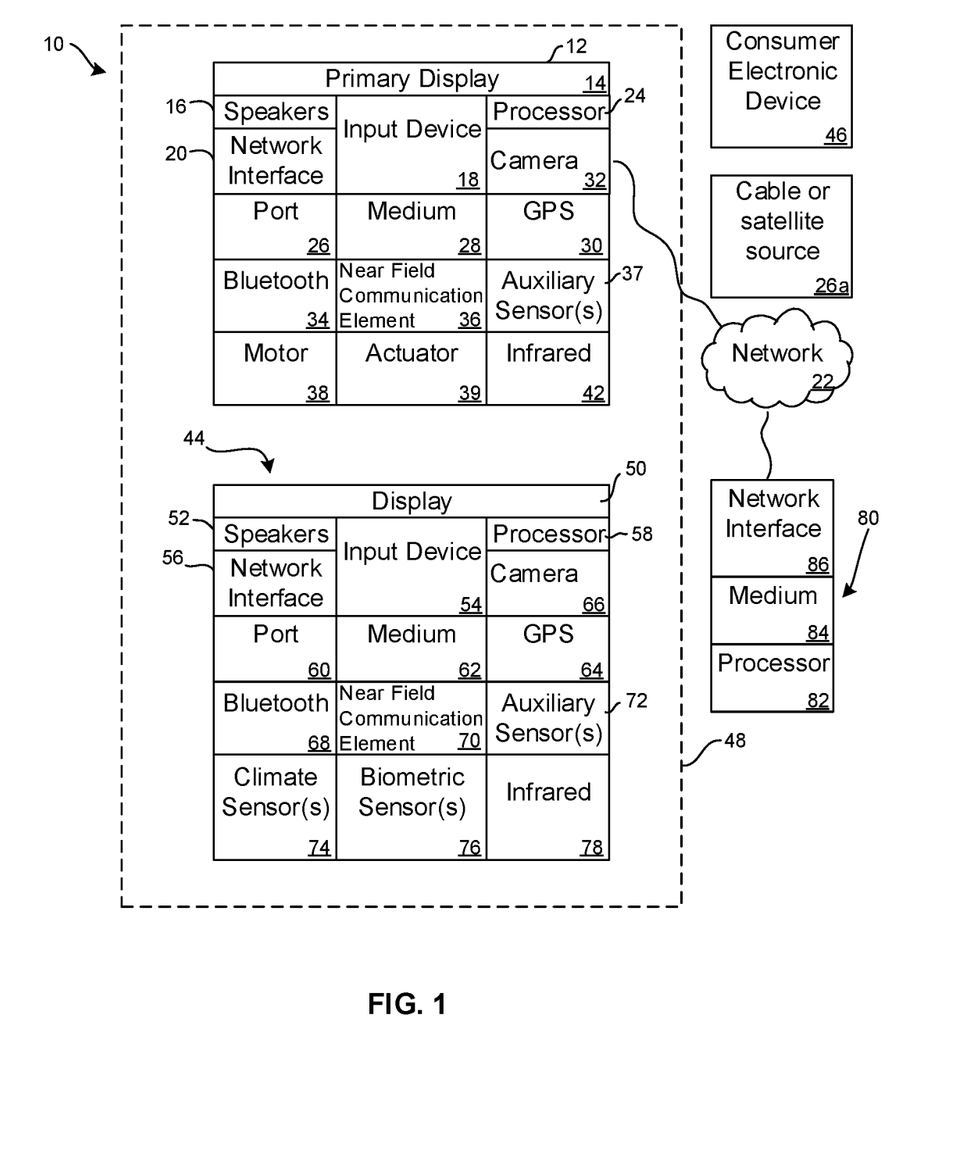
FIG. 1 is a block diagram of an example system including an example in consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also n some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVM 12 may include still other sensors such as e.g., one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images hereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device, A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
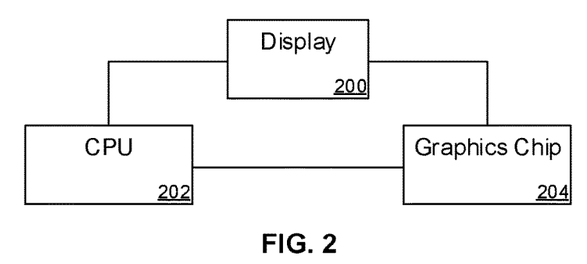
FIG. 2 is a simplified block diagram of a display device (DD)

FIG. 2 shows an example display device that may be embodied by the AVD 12 in FIG. 1 and incorporate components thereof. As shown, the display device in FIG. 2 includes one or more video displays 200 that presents demanded images under control of one or more processors such as a central processing unit (CPU) 202 and a graphics chip or board 204 that itself typically may include one or more graphics processors.

Figure 3:
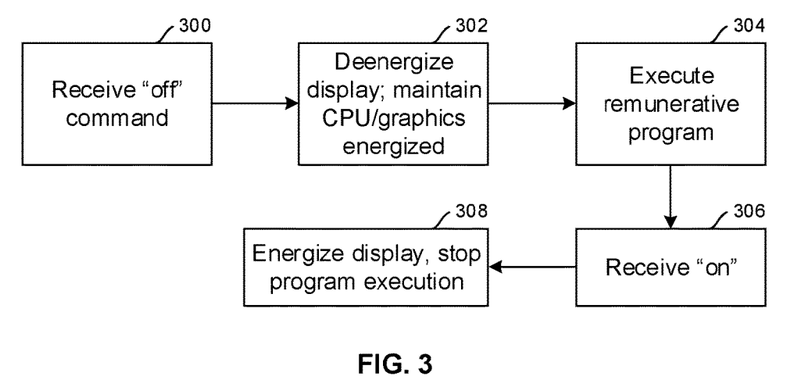
FIGS. 3-5 are flow charts of example logic according to present principles.

FIG. 3 illustrates example logic consistent with present principles. Commencing at block 300, the processor(s) of the display device 14/200 (e.g., the CPU 202 in FIG. 2) or other similar device receives an "off" command to deenergize. The "off" command may be received wirelessly from a remote control (RC), or by voice input, or from manipulation of an off button on the chassis of the device, or by other input.

Moving to block 302, in response to the "off" command the processor (e.g., the CPU 202) of the display device deenergizes the display 200 so that it ceases to present images thereon. Alternatively, the processor can cause the display to present a screen saver image(s). Generally, the step at block 302 causes the display 200 to stop presenting video from an external input such as a set top box, satellite receiver, broadcast TV input port, etc.

However, while (typically) deenergizing the display 200, the processor maintains energized the processor (e.g., the CPU 202) and if desired the graphics chip 204 with graphics processor(s), so that the processor(s) that remain energized can, transparently to the user/viewer, execute a remunerative program at block 304. Examples of remunerative programs include "Bitcoin Mining" and "SETI Alien Search". Cryptocurrency mining such as Bitcoin mining is an example of a remunerative program in which the processor(s) of the display device uses software, e.g., downloaded from the Internet, to solve math problems and are issued credit such as a certain number of bitcoins in exchange. Bitcoins are an example of block chain-based electronic currency. Even if bitcoins are not mined, computers may cooperatively verify block chains.

In a specific example. Bitcoin mining is a process executed by the processor(s) that repeatedly attempts to calculate a secure hash algorithm (SHA)-256 hash of a block's header that starts with many zeros. To generate a new hash each round, a nonce is incremented. When a block (or set number of blocks) is discovered, an account associated with the display device (meaning the owner or user of the display device) is remunerated or credited, in the case of Bitcoin, with Bitcoin. Additionally, the account may receive credits paid by users sending transactions to be included in the newly discovered block.

SETI Alien Search is an example of a remunerative program in which the display device downloads a program, e.g., from the Internet that in turn, when executed by the display device (processor(s)), downloads and analyzes radio telescope data, providing results to a data center that can result in the account of the display device being credited in exchange for certain data sent to the data center.

Note that credit for executing the remunerative programs may be attained in various ways in addition to those discussed above (e.g., by being awarded with cryptocurrency). As an example, a certain amount of credit may be accorded to the user's account for every CPU cycle consumed in executing the remunerative program. Or, credit may be accorded based on network data packets transmitted to and/or from the user's device during the execution of the remunerative program. Or, credit may be accorded as indicated above by the performance within the program as to whether bitcoins were mined, or in the case of SETI Alien Search, the number of heavenly bodies monitored, etc. Combinations of these methods for awarding credit for remunerative program execution may be used.

Should the display device receive, at block 306, a command to energize the display 200 (equivalently, a command to present video from an external input), the display is energized at block 308 and caused to present the demanded video, and execution of the remunerative program is stopped. In this way, the display device processor(s) are preferentially dedicated to providing demanded video on the display, and only when the display 200 is not in use are the processors used to execute the remunerative program.

Figure 4:
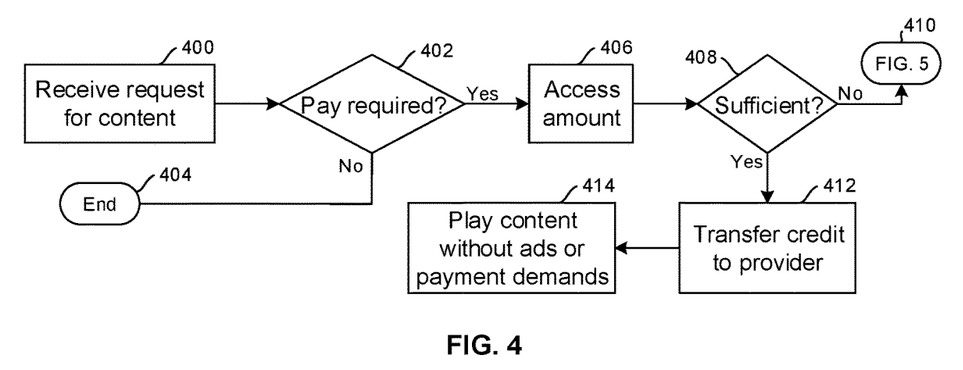

FIG. 4 illustrates how the credits acquired from the process of FIG. 3 can be used. Commencing at block 400, a request for content is received by the display device. For example, a command to tune to a particular TV channel may be received.

Moving to decision diamond 402, the display device determines whether the content requires a fee to be paid, e.g., a one-time pay-per-view fee, or a subscription service fee, or other payment. This may be determined by the processor of the display device identifying (for example, using optical character recognition or voice recognition on spoken messages) that a message is received from the tuned-to channel to the effect that credit card payment or other payment is required to view the content.

If no pay is required for the demanded content the process ends at state 404 for present purposes. However, if payment is required the logic moves to block 406 to access the account associated the display device mentioned above, and at block 408 the amount of credit in the account is compared with the amount of demanded payment to view the requested content. If sufficient credit exists does not exist in the account, at state 410 the logic moves to FIG. 5, described further below. However, if sufficient credit exists in the account to cover the demanded payment for the requested content, credit from the account is transferred to an account designated by the content provider at block 412. This transfer may use computer network financial transfer mechanisms typically used by viewers of TVs wishing to watch a pay-per-view event, for example, or it may use other appropriate money transfer means such as wiring funds. In any case, once paid for, the content provider typically gives the display device access to the requested content for play on the display device at block 414. The requested content, once paid for, typically is presented without advertisements and without further demands for payment.

Figure 5:
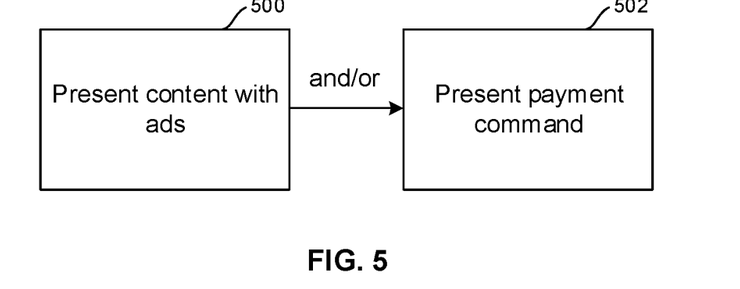

FIG. 5 illustrates example processes that may occur when insufficient funds or other credit exist in the account associated with the display device to pay for requested content in FIG. 4. Commencing at block 500, the requested content may be presented but with advertisements in it as a means of recouping income for providing the content. In addition, or alternatively, a demand for payment may be presented at block 502 and the requested content not provided until the payment is made. The demand for payment may be a demand for the total cost of the requested content or for only the amount that the account associated with the display device is short of. For example, if requested content costs $2, and the account associated with the display device has only $1 in it, the $1 may be transferred to the content provider and the content provider may request an additional $1. Or, continuing with this example, instead of demanding an additional $1, the credit in the account associated with the display device may be provided to the content provider and the request content provided but with only a fraction (less than one but greater than zero) of the advertisements presented in the content as would be presented if no partial payment at all were received.

Figure 6:
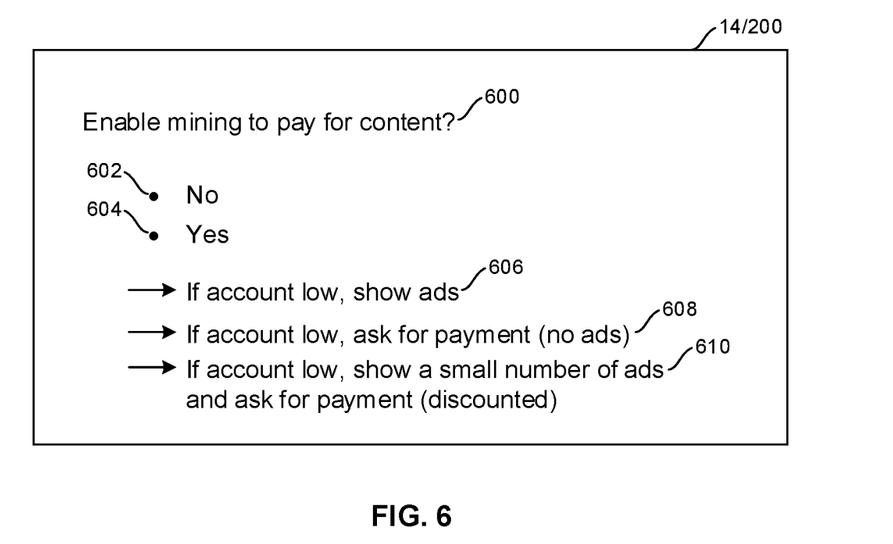
FIG. 6 is a screen shot of an example user interface (UI) consistent with present principles.

FIG. 6 illustrates an example user interface (UI) that can be presented on a display such as the display 14 in FIG. 1 or display 200 in FIG. 2 consistent with present principles, it being understood that the presentation may additionally or alternatively be in audio. As shown, a query 600 may be presented to ask the viewer whether he wishes to enable remunerative program execution to, for example, pay for content requiring payment. The user can select a "no" selector 202 to decline to use his display device to execute remunerative programs, or a "yes" selector 204 to use his display device to execute remunerative programs. It is to be understood that a subsequent UI may be presented in response to selecting the "yes" selector 204 listing remunerative programs from which the viewer can choose, with viewer selections causing downloading of the necessary software to execute the programs.

The UI shown in FIG. 6 may allow the viewer to select various modes of payment in line with disclosure above. For example, the user may select at 606 to show advertisements in content requiring payment if insufficient credit exists in his account to pay for the content. He may select at 608 to be asked for payment by the content provider in the event that the account is low on credit/funds to avoid having advertisements inserted into the content. The viewer may further select a selector 610 to select to have a relatively small number of advertisements inserted into content when insufficient credit exists in his account and to be asked for a discounted payment, with what credit/funds exist in his account being transferred as partial payment to the content provider.

While particular techniques are herein shown and described in detail, it is to be understood that the subject matter which is encompassed by the present application is limited only by the claims.

What is claimed is:

1. A method, comprising:
   identifying an application that may be pre-installed or downloaded to a game console or display device;
   executing the application to remunerate a user account for use of processing power of the game console or display device when the game console or display device is not being used for playing a game or displaying content; and
   paying for the game or content at least in part using credit in an account acquired as a result of executing the application, the credit being identified based at least in part on:
   number of heavenly bodies monitored during execution of the application.

2. The method of claim 1, comprising:
   responsive to the command, deenergizing the display and maintaining energized at least one processor and at least one graphics chip of the display;
   with the display deenergized, using the processor and graphics chip to execute the application;
   crediting an account in accordance with executing the application; and
   stopping execution of the application responsive to a command to energize the display.

3. The method of claim 1, comprising:
   responsive to a request for content requiring payment, determine whether sufficient credit in the account gained from executing the application exists to pay for the content.

4. The method of claim 3, comprising:
   responsive to determining that sufficient credit in the account gained from executing the application exists to pay for the content, presenting the content without advertisements.

5. The method of claim 3, comprising:
   responsive to determining that sufficient credit in the account gained from executing the application exists to pay for the content, not demanding payment for the content.

6. The method of claim 3, comprising:
   responsive to determining that insufficient credit in the account gained from executing the application exists to pay for the content, present the content with advertisements.

7. The method of claim 3, comprising:
   responsive to determining that insufficient credit in the account gained from executing the application exists to pay for the content, demanding payment for the content.

8. The method of claim 1, wherein the application comprises processing telescope data.

9. The method of claim 1, wherein paying for the game or content at least in part using credit is in accordance with input from a user interface (UI) comprising:
   a first selector to decline to use the game console or display device to execute a remunerative program; and a second selector to agree to use the game console or display device to execute a remunerative program.

10. The method of claim 9, wherein the UI comprises:
a first option select to show advertisements in content requiring payment if insufficient credit exists in an account to pay for the content; and
a second option to select to have advertisements inserted into content when insufficient credit exists in the account and to be asked for a discounted payment.

11. The method of claim 1, wherein the credit is identified based at least in part on number of heavenly bodies monitored during execution of the application.

12. An apparatus, comprising:
at least one processor configured with instructions for:
executing an application to remunerate a user account for use of processing power of the game console or display device when the game console or display device is not being used for playing a game or displaying content;
responsive to a request for content requiring payment, determining whether sufficient credit in the user account gained from executing the application exists to pay for the content;
responsive to determining that sufficient credit in the account gained from executing the application exists to pay for the content, presenting the content without advertisements; and
responsive to determining that insufficient credit in the account gained from executing the application exists to pay for the content, presenting the content with advertisements;
the credit being identified based at least in part on:
number of heavenly bodies monitored during execution of the application.

13. The apparatus of claim 12, wherein the application comprises processing telescope data.

14. The apparatus of claim 12, wherein the instructions are executable to present at last one user interface (UI) comprising:
a first selector to decline to use the game console or display device to execute a remunerative program; and
a second selector to agree to use the game console or display device to execute a remunerative program.

15. The apparatus of claim 14, wherein the UI comprises:
a first option select to show advertisements in content requiring payment if insufficient credit exists in an account to pay for the content; and
a second option to select to have advertisements inserted into content when insufficient credit exists in the account and to be asked for a discounted payment.

* * * * *